United States Patent
Heiland et al.

(10) Patent No.: US 12,075,252 B1
(45) Date of Patent: Aug. 27, 2024

(54) RADIO FREQUENCY CAPTURE ANALYSIS REPORTING

(71) Applicant: Rapid7, Inc., Boston, MA (US)

(72) Inventors: Deral Heiland, Xenia, OH (US);
Matthew Kienow, Dayton, OH (US);
Adam Bunn, Deep River (CA);
Alberto Cecioni, Los Angeles, CA (US)

(73) Assignee: Rapid7, Inc., Boston, MA (US)

( * ) Notice: Subject to any disclaimer, the term of this patent is extended or adjusted under 35 U.S.C. 154(b) by 298 days.

(21) Appl. No.: 17/526,004

(22) Filed: Nov. 15, 2021

(51) Int. Cl.
*H04W 12/122* (2021.01)
*H04L 9/40* (2022.01)
*H04W 8/00* (2009.01)
*H04W 24/10* (2009.01)

(52) U.S. Cl.
CPC ....... *H04W 12/122* (2021.01); *H04L 63/1408* (2013.01); *H04W 8/005* (2013.01); *H04W 24/10* (2013.01)

(58) Field of Classification Search
CPC ... H04W 12/122; H04W 8/005; H04W 24/10; H04L 63/1408
See application file for complete search history.

(56) References Cited

U.S. PATENT DOCUMENTS

| | | | |
|---|---|---|---|
| 2013/0074188 A1* | 3/2013 | Giakouminakis | G06F 21/577 726/25 |
| 2018/0124096 A1* | 5/2018 | Schwartz | H04W 8/22 |
| 2019/0052995 A1* | 2/2019 | Agrawal | H04W 4/38 |

* cited by examiner

*Primary Examiner* — Brian F Shaw
(74) *Attorney, Agent, or Firm* — Ashwin Anand

(57) ABSTRACT

Various embodiments include systems and methods of implementing radio frequency (RF) capture analysis reporting. The implementing may include receiving RF data captured by RF capture component(s) positioned at location(s) within a physical environment. The captured RF data includes RF device metrics associated with RF device(s) identified by the RF capture component(s) as being located within the physical environment. One or more analysis operations may be performed with respect to the RF device(s) based at least in part on the RF device metrics. Based at least in part on a result of the analysis operation(s), a potential security vulnerability associated with a particular RF device may be identified. A report may be generated that identifies at least the potential security vulnerability associated with the particular RF device.

20 Claims, 7 Drawing Sheets

600

Receive radio frequency (RF) data captured by RF capture component(s) positioned at location(s) within a physical environment. The captured RF data includes RF device metric(s) associated with RF device(s) identified by the RF capture component(s) as being located within the physical environment.
610

Perform analysis operation(s) with respect to the RF device(s). The analysis operation(s) are performed based at least in part on the RF device metric(s) included in the captured RF data received from the RF capture component(s).
620

Identify, based at least in part on a result of the analysis operation(s), a potential security vulnerability associated with a particular RF device located within the physical environment.
630

Generate a report that identifies at least the potential security vulnerability associated with the particular RF device.
640

*FIG. 6*

RADIO FREQUENCY CAPTURE ANALYSIS REPORTING

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities. Radio frequency (RF) devices attached to a physical network infrastructure of the company network may represent a security risk to the company. There is a need for improved systems and methods of assessing the information security risk that such RF devices may present to the company.

SUMMARY OF EMBODIMENTS

The systems and methods described herein may be employed in various combinations and in embodiments to implement a system for identifying, monitoring, and tracking radio frequency (RF) device behavior within a physical environment. In the present disclosure, aggregated RF device metrics may be analyzed and checked against known vulnerability data sources to present an organization with a comprehensive view of potential threats to their resources in both the physical space and network infrastructure.

BRIEF DESCRIPTION OF THE DRAWINGS

FIG. 6 is a flowchart that illustrates an example process of RF capture analysis reporting, according to some embodiments.

Figure 1:
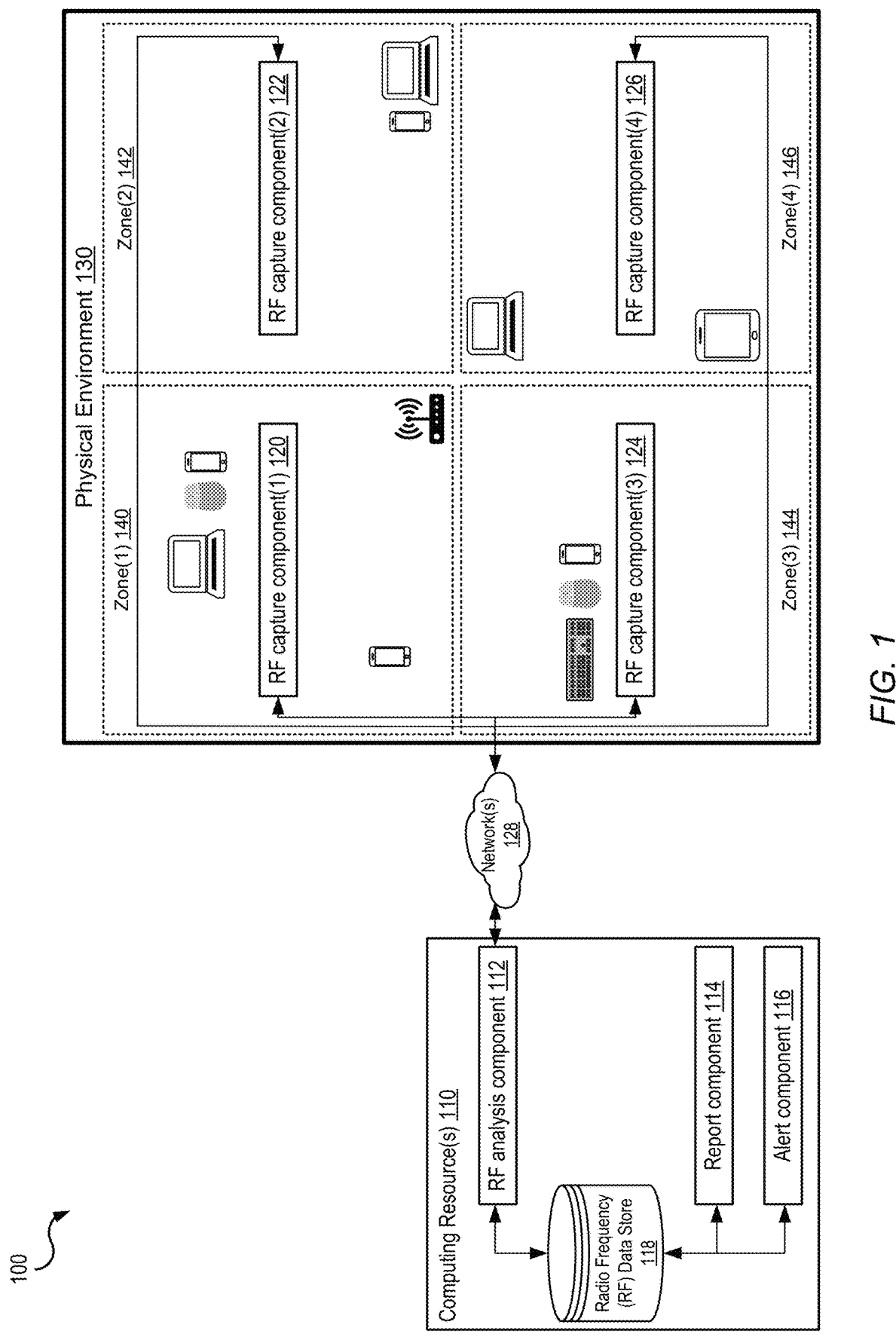
FIG. 1 is a block diagram illustrating an example system that implements RF capture analysis reporting, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods for identifying, monitoring, and tracking RF device behavior within a physical environment of an organization. Further, the systems and methods of the present disclosure may provide the ability to identify those RF devices that may be attached to a physical network infrastructure of the organization in order to assess the information security risk to the organization. In the present disclosure, one or more RF monitoring nodes positioned at one or more locations in the physical environment may be configured to capture RF device fingerprint and location data. The fingerprints may be produced through a number of different mechanisms. Location data associated with specific location(s) of the RF monitoring node(s) within the physical environment may be stored in conjunction with the RF fingerprint data collected by the RF monitoring node(s). According to various embodiments, the availability of the location data may be utilized to: classify the RF devices as static or mobile within the physical environment; analyze mobile device movement within the physical environment; and identify the presence of transient devices or anomalous device movement within the physical environment. By combining identification, monitoring, and known vulnerability awareness with individual device behavior in relation to a physical environment, the system of the present disclosure may provide an organization with the ability to recognize potential threats to the organization's resources in both the physical space and network infrastructure.

In contrast to conventional network monitoring and security products, the system of the present disclosure utilizes information regarding RF devices and their relation to both the physical and network space. The system of the present disclosure may be configured to perform behavioral analytics operations using various metrics, including but not limited to: RF protocols; communication patterns; device movement within a physical space; and potential intersections with network infrastructures. Through the use of such behavioral analytics operations, the system of the present disclosure may analyze captured data and present users with potential threats in order to allow them to focus on reducing and mitigating information security risks from RF devices in their physical and network environments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements RF capture analysis reporting, in accordance with some embodiments. Through the use of behavioral analytics using various metrics (e.g., RF protocols, communication patterns, device movement, and potential intersections with network infrastructures, etc.), the system 100 of FIG. 1 may analyze captured RF data and present users with information regarding potential threats. Such information may provide various benefits, including allowing an organization to focus on reducing and mitigating information security risks from RF devices in their physical and network environments.

Figure 7:
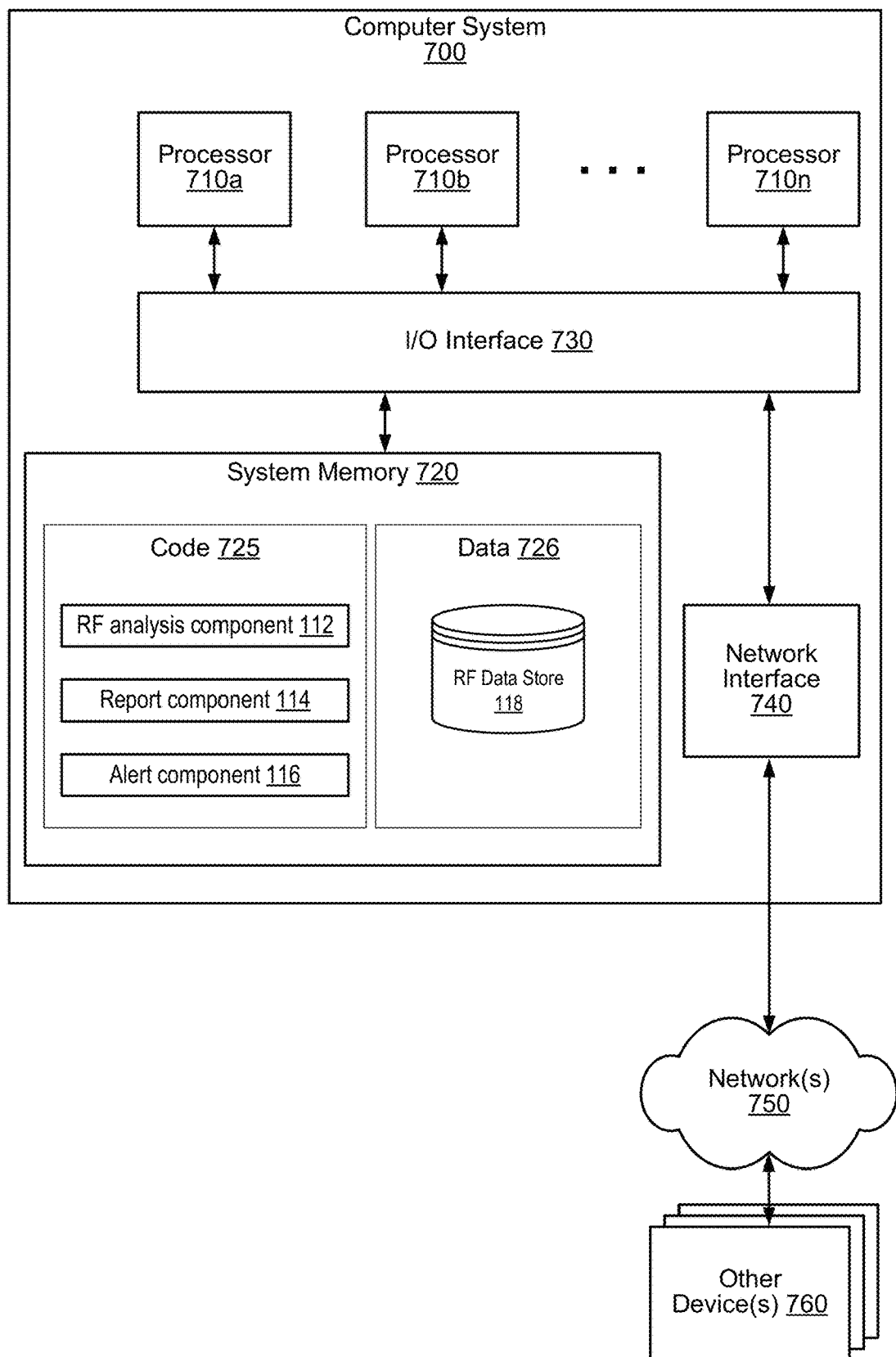
FIG. 7 is a block diagram illustrating an example computer system that may be used to implement one or more portions of a system that implements RF capture analysis reporting, according to some embodiments.

FIG. 1 depicts one or more computing resources 110, which may include one or more hardware processors with associated memory (not shown, see e.g. FIG. 7). The computing resource(s) 110 may be configured to implement the RF capture analysis reporting. FIG. 1 further illustrates that the computing resource(s) 110 may be configured to implement multiple components associated with various features of the RF capture analysis reporting, including: an RF analysis component 112; a report component 114; and an alert component 116. FIG. 1 further illustrates that the computing resource(s) 110 may include an RF data store 118 configured to store RF data and that each of the individual components 112-116 may be configured to communicate with the RF data store 118, according to some embodiments.

In the particular embodiment depicted in the example of FIG. 1, multiple RF capture components are illustrated, including: a first RF capture component 120; a second RF capture component 122; a third RF capture component 124; and a fourth RF capture component 126. Each of the individual RF capture components 120-126 depicted in the example of FIG. 1 are also referred to herein as "RF monitoring nodes" and may correspond to hardware devices built with various RF chipsets and antennas, as described further herein with respect to FIG. 2 through FIG. 5.

According to some embodiments, each of the individual RF capture components 120-126 may cover ISM band(s) and common RF frequencies typically used by a consumer, enterprise, industrial, medical and transportation-based technology devices. As used herein, the terms "ISM band" and "ISM bands" refer to one or more radio bands representing portions of the radio spectrum originally designated as being reserved for industrial, scientific, and medical purposes, excluding applications in telecommunications. However, there has been significant growth in utilization of these bands for short-range, low-power wireless communication systems. Such growth has been driven partly by the fact that these bands may be approved for such devices and can be utilized without a government license, in contrast to other transmitters. Illustrative, non-limiting examples where such ISM bands may be utilized for short-range, low-power wireless communication include: Bluetooth® devices; near field communication (NFC) devices; and wireless computer network (Wi-Fi) devices, among others. Each of these example devices may use ISM frequencies, even though such low-power transmitters are not considered to be "true" ISM devices.

According to some embodiments, each of the individual RF capture components 120-126 may include one or more network interfaces and connectivity to support transmission of captured data to the RF analysis component 112, as described further herein with respect to FIG. 2 through FIG. 5. In some cases, each of the individual RF capture components 120-126 may include local storage in order to sustain processing in the event that network connectivity interruptions to the RF analysis component 112 occur.

FIG. 1 illustrates that the RF capture components 120-126 may be deployed in a distributed and strategic manner across a physical environment 130 of an organization. According to various embodiments, the installed RF monitoring node "density" within the physical environment 130 may have some correlation to the granularity of the physical device position metrics captured. In the example depicted in FIG. 1, the physical environment 130 is depicted as having multiple zones, including: a first zone 140; a second zone 142; a third zone 144; and a fourth zone 146. It will be appreciated that the physical environment 130 depicted in the example of FIG. 1 is for illustrative purposes only and that there may be an alternative number and/or arrangement of RF capture components and/or an alternative number and/or arrangement of zones within the physical environment 130.

Each of the individual RF capture components 120-126 may be configured to capture RF device fingerprint and location data, according to some embodiments. For example, the first RF capture component 120 may be configured to capture RF device fingerprint and location data for one or more RF devices located within the first zone 140, as described further herein with respect to FIG. 2. As another example, the second RF capture component 122 may be configured to capture RF device fingerprint and location data for one or more RF devices located within the second zone 142, as described further herein with respect to FIG. 3. As yet another example, the third RF capture component 124 may be configured to capture RF device fingerprint and location data for one or more RF devices located within the third zone 144, as described further herein with respect to FIG. 4. As a further example, the fourth RF capture component 126 may be configured to capture RF device fingerprint and location data for one or more RF devices located within the fourth zone 146, as described further herein with respect to FIG. 5.

Each of the individual RF capture components 120-126 may be configured with details regarding their precise location within the physical environment 130. For example, the first RF capture component 120 may be configured with details regarding its precise location within the first zone 140, the second RF capture component 122 may be configured with details regarding its precise location within the second zone 142, the third RF capture component 124 may be configured with details regarding its precise location within the third zone 144, and the fourth RF capture component 126 may be configured with details regarding its precise location within the fourth zone 146. According to some embodiments, the RF analysis component 112 may perform RF device, physical space and/or network space analysis operations based at least in part on such precise location information, as described herein.

Each of the individual RF capture components 120-126 may be configured to capture measured RF signal strength of various RF devices within the physical environment 130. To illustrate, each of the individual RF capture components 120-126 may be configured to capture measured RF signal strength of one or more RF devices within their respective zones 140-146. Each of the individual RF capture components 120-126 may be configured to passively discover one or more RF devices based on an analysis of RF protocol broadcast, unicast, and multicast signals emitted by an individual RF device within the physical environment 130. To illustrate, each of the individual RF capture components 120-126 may be configured to passively discover one or more RF devices based on an analysis of RF protocol broadcast, unicast, and multicast signals emitted by an individual RF device within their respective zones 140-146.

According to some embodiments, examples of metrics that may be captured by the individual RF capture components 120-126 for an individual RF device may include: protocol version(s); device manufacturer; device type; and device-specific metric(s), among other alternatives. To illustrate, each of the individual RF capture components 120-126 may be configured to capture metrics for individual RF devices within their respective zones 140-146. Each of the individual RF capture components 120-126 may be configured to identify specific RF devices that communicate with other RF devices within the physical environment 130, according to some embodiments. To illustrate, each of the individual RF capture components 120-126 may be configured to identify specific RF devices within their respective zones 140-146 that communicate with other RF devices within the physical environment 130. According to some embodiments, each of the individual RF capture components 120-126 may be configured to actively probe devices for additional metrics based on the specific RF protocols that are detected as being used. According to some embodiments, examples of such additional metrics for an individual RF device may include: protocol version(s); device manufacturer; device type; and device-specific metric(s), among other alternatives. To illustrate, each of the individual RF capture components 120-126 may be configured to actively probe devices within their respective zones 140-146 for additional metrics based on the specific RF protocols that are detected as being used.

Each of the individual RF capture components 120-126 may include a network interface (not shown in FIG. 1, see e.g. FIG. 2 through FIG. 5) and may be configured to transmit captured RF data/metrics to the RF analysis component 112 (e.g., via one or more networks 128 in the example depicted in FIG. 1). For example, based at least in part on the captured RF data/metrics received from the individual RF capture components 120-126, the RF analysis component 112 may be configured to perform one or more of: RF device analysis operation(s); physical space analysis operation(s); and network space analysis operation(s).

According to some embodiments, the RF analysis component 112 may be configured to perform RF device analysis based on an analysis of captured RF data that is received from the individual RF capture components 120-126. In the example depicted in FIG. 1, the RF analysis component 112 may be configured to store at least the captured RF data received from the individual RF capture components 120-126 and optionally at least a portion of the results of the analysis of the captured RF data at the RF data store 118.

According to some embodiments, the RF analysis component 112 may be configured to identify various potential vulnerability issues (e.g., potential security vulnerabilities) associated with one or more RF devices located within the physical environment 130 based on various factors, including: specific device hardware version(s); firmware version(s); and communication protocol(s), among other alternatives. According to some embodiments, the RF analysis component 112 may be configured to access one or more data sources (not shown in FIG. 1) to check device and protocol information. Examples of such data sources may include: vulnerability database(s); vendor advisory source(s); threat intelligence feed(s); standards specification(s); and custom data source(s), among other alternatives.

According to some embodiments, the RF analysis component 112 may be configured to perform physical space analysis with regard to RF devices in the physical environment 130. As an example, the RF analysis component 112 may be configured to classify individual RF devices as static or mobile within the physical environment 130. As another example, the RF analysis component 112 may be configured to analyze mobile device movement within the physical environment 130. To illustrate, analysis of mobile device movement may include identifying the presence of transient devices or anomalous device movement within the physical environment 130.

According to some embodiments, the RF analysis component 112 may be configured to perform network space analysis. To illustrate, network space analysis may include identifying devices using RF protocols that are not internet routable and/or whether a particular RF device has any degree of separation from the network infrastructure of the organization.

The report component 114 and the alert component 116 may be configured to present the organization with the ability to identify potential threats to the organization's resources in both the physical space and network infrastructure.

According to some embodiments, the report component 114 may provide configurable report functionality. Examples of RF device metrics that may be included in a report generated by the report component 114 may include: device manufacturer, model and type; RF protocol version(s); hardware and firmware version(s); vulnerability status; current physical location (within the physical environment 130); and anomalous device movement (e.g., based on historical location within the physical environment 130); and network infrastructure risk analysis, among other alternatives.

According to some embodiments, the alert component 116 may provide configurable alerting functionality. According to some embodiments, the alert component 116 may be configured to accept input from users (not shown in FIG. 1) to acknowledge alerts. Examples of information included in an alert generated by the alert component 116 may include: new RF device(s) being detected; one or more identified vulnerabilities; and anomalous device movement, among other alternatives.

Thus, the system 100 depicted in FIG. 1 represents an example of a system that implements RF capture analysis reporting according to the present disclosure. Through the use of behavioral analytics using various metrics (e.g., RF protocols, communication patterns, device movement within the physical environment 130, and potential intersections with network infrastructures, etc.), the system 100 of FIG. 1 may analyze captured RF data and present users with information regarding potential threats. Such information may provide various benefits, including allowing an organization to focus on reducing and mitigating information security risks from RF devices in their physical and network environments.

FIGS. 2 through 5 are block diagrams illustrating selected components of the example system 100 depicted in FIG. 1 being utilized for RF capture analysis reporting, according to various embodiments of the present disclosure. In particular, FIG. 2 through FIG. 5 illustrate examples of the individual RF capture components 120-126 depicted in FIG. 1 being utilized to collect RF data within the individual zones 140-146 of the physical environment 130. FIG. 2 through FIG. 5 further illustrate examples of the collected RF data being transmitted to the RF analysis component 112 in order to perform RF device, physical space and/or network space analysis operations, as described herein.

Figure 2:
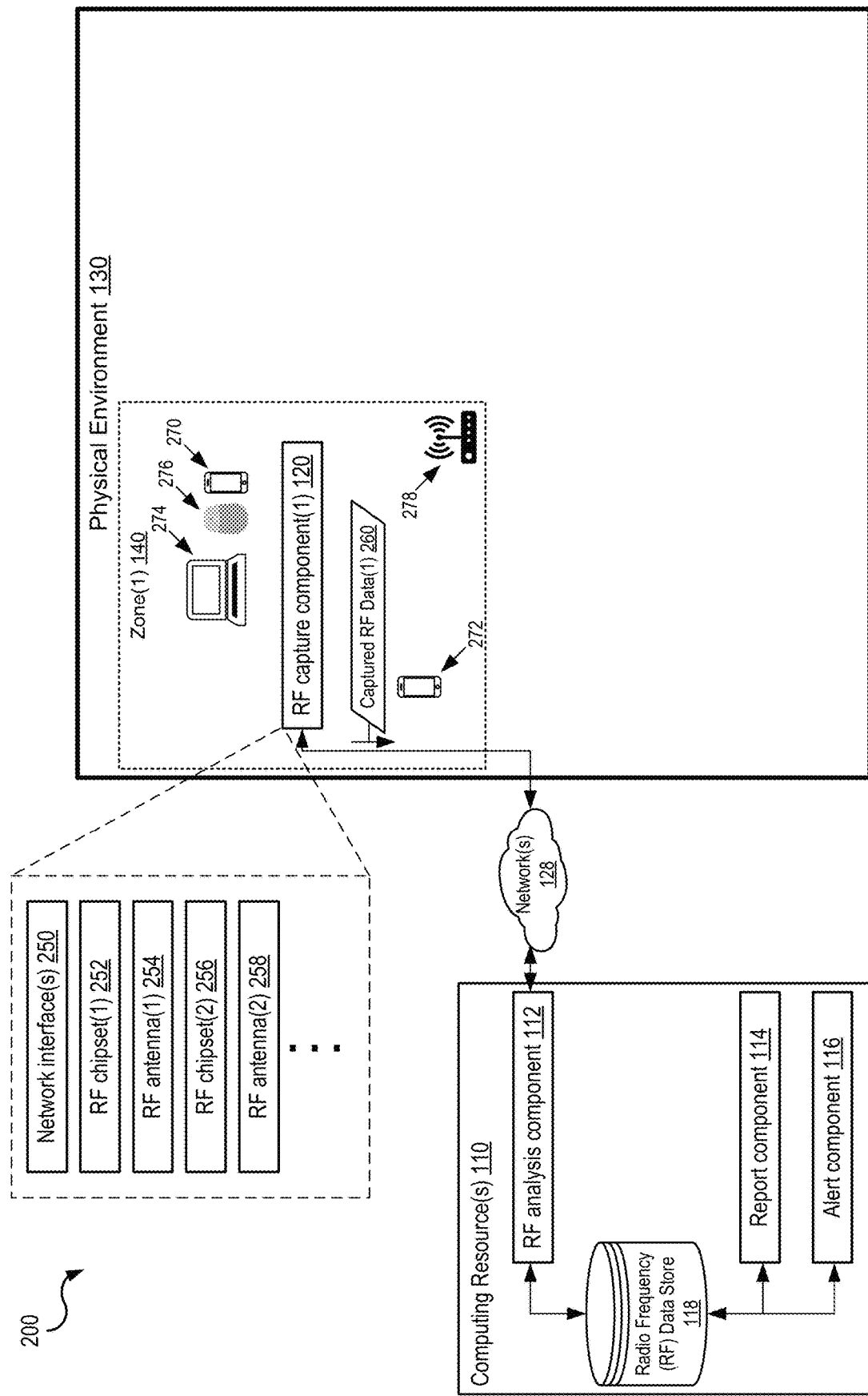
FIGS. 2 to 5 are block diagrams illustrating selected components of the example system depicted in FIG. 1 being utilized for RF capture analysis reporting, according to some embodiments.

Referring to FIG. 2, a block diagram 200 illustrates an example of the first RF capture component 120 of FIG. 1 being utilized to collect RF data within the first zone 140 of the physical environment 130, according to some embodiments. FIG. 2 further illustrates the transmission of first captured RF data 260 collected by the first RF capture component 120 to the RF analysis component 112 for RF device, physical space and/or network space analysis operations, as described herein.

FIG. 2 illustrates that the first RF capture component 120 may be a first hardware device positioned within the first zone 140 of the physical environment 130. FIG. 2 further illustrates that the first RF capture component 120 may correspond to a first "RF monitoring node" that includes various components, including one or more RF chipsets, one or more antennas, and one or more network interfaces. In the particular embodiment depicted in FIG. 2, the first RF capture component 120 includes at least: one or more network interfaces 250; a first RF chipset 252 that may be associated with a first RF antenna 254; and a second RF chipset 256 that may be associated with a second RF antenna 258. FIG. 2 illustrates, via dashed lines, that the first RF capture component 120 may include one or more additional RF chipsets that may be associated with one or more additional RF antennas, according to some embodiments.

According to some embodiments, the various components of the first RF capture component 120 depicted in FIG. 2 may be configured to provide the first RF capture component 120 with the ability to cover ISM band(s) and "common" RF frequencies typically used by consumer, industrial, medical, and transportation-based technology devices. As previously described herein, examples of devices that may utilize ISM band(s) for short-range, low-power wireless communication include: Bluetooth® devices; NFC devices; and Wi-Fi devices, among others. According to some embodiments, the first RF chipset 252 and the first RF antenna 254 of the first RF capture component 120 may be configured to provide the first RF capture component 120 with the ability to capture RF data from devices that utilize a particular ISM band for short-range, low-power wireless communication. According to some embodiments, the second RF chipset 256 and the second RF antenna 258 of the first RF capture component 120 may be configured to provide the first RF capture component 120 with the ability to capture RF data from devices that utilize a particular "common" RF frequency (or a particular range of "common" RF frequencies). As described herein, in some embodiments, the first RF capture component 120 may include one or more additional RF chipsets that may be associated with one or more additional RF antennas. Such additional RF chipsets and associated RF antennas may be configured to provide the first RF capture component 120 with the ability to capture RF data from devices that utilize one or more other ISM bands for short-range, low-power wireless communication, according to some embodiments. Such additional RF chipsets and associated RF antennas may be configured to provide the first RF capture component 120 with the ability to capture RF data from devices that utilize one or more other "common" RF frequencies (or ranges of "common" RF frequencies), according to some embodiments.

In the particular embodiment depicted in FIG. 2, various RF devices are illustrated as being located within the first zone 140 of the physical environment 130. To illustrate, in FIG. 2, the devices within the first zone 140 include: a first RF device 270; a second RF device 272; a third RF device 274; a fourth RF device 276; and a fifth RF device 278. The various components of the first RF capture component 120 may provide the first RF capture component 120 with the ability to capture RF data from each of the individual devices 270-278 within the first zone 140. The various components of the first RF capture component 120 may provide the first RF capture component 120 with the ability to capture various metrics for the individual RF devices 270-278 within the first zone 140.

The first RF capture component 120 may be configured to capture RF device fingerprint and location data for the various individual RF devices 270-278 located within the first zone 140, according to some embodiments. The first RF capture component 120 may be configured with details regarding its precise location within the physical environment 130 (e.g., details regarding its location within the first zone 140). The first RF capture component 120 may be configured to capture measured RF signal strength of the various individual RF devices 270-278 located within the first zone 140, according to some embodiments. The first RF capture component 120 may be configured to passively discover one or more of the RF devices 270-278 based on an analysis of RF protocol broadcast, unicast, and multicast signals emitted by an individual RF device within the first zone 140. According to some embodiments, examples of metrics that may be captured by the first RF capture component 120 for the individual RF devices 270-278 within the first zone 140 may include: protocol version(s); device manufacturer; device type; and device-specific metric(s), among other alternatives. The first RF capture component 120 may be configured to identify one or more specific RF devices of the RF devices 270-278 within the first zone 140 that communicate with one or more other RF devices within the physical environment 130 (including other RF devices in the other zones 142, 144, 146 which are not shown in FIG. 2). The first RF capture component 120 may be configured to actively probe the individual RF devices 270-278 within the first zone 140 for additional metrics based on the specific RF protocols that are detected as being used. According to some embodiments, examples of such additional metrics may include: protocol version(s); device manufacturer; device type; and device-specific metric(s), among other alternatives.

FIG. 2 illustrates that the first RF capture component 120 may be configured to utilize the network interface(s) 250 to transmit the RF data that is captured from the individual devices within the first zone 140 to the RF analysis component 112 (e.g., via the network(s) 128) as the first captured RF data 260. The RF analysis component 112 may be configured to perform various operations based at least in part on the first captured RF data 260 received from the first RF capture component 120, as described herein. For example, based at least in part on the first captured RF data 260 received from the first RF capture component 120, the RF analysis component 112 may be configured to perform one or more of: RF device analysis operation(s); physical space analysis operation(s); and network space analysis operation(s).

To illustrate, the first RF capture component 120 may be configured to capture RF data from the first RF device 270, which may correspond to a mobile device such as a smartphone which may utilize one or more ISM bands and/or one or more "common" RF frequencies for wireless communication. The first RF capture component 120 may be configured to utilize the network interface(s) 250 to transmit the RF data that is captured from the first RF device 270 to the RF analysis component 112 (e.g., via the network(s) 128) as part of the first captured RF data 260. The RF analysis component 112 may be configured to perform various operations based at least in part on the RF data that is captured from the first RF device 270 and received from the first RF capture component 120 as part of the first captured RF data 260. For example, based at least in part on the RF data that is captured from the first RF device 270, the RF analysis component 112 may be configured to perform RF device analysis operation(s), physical space analysis operation(s) and/or network space analysis operation(s) related to the first RF device 270.

As another example, the first RF capture component 120 may be configured to capture RF data from the second RF device 272, which may correspond to another mobile device such as another smartphone which may utilize one or more ISM bands and/or one or more "common" RF frequencies for wireless communication. The first RF capture component 120 may be configured to utilize the network interface(s) 250 to transmit the RF data that is captured from the second RF device 272 to the RF analysis component 112 (e.g., via the network(s) 128) as part of the first captured RF data 260. The RF analysis component 112 may be configured to perform various operations based at least in part on the RF data that is captured from the second RF device 272 and received from the first RF capture component 120 as part of the first captured RF data 260. For example, based at least in part on the RF data that is captured from the second RF device 272, the RF analysis component 112 may be configured to perform RF device analysis operation(s), physical space analysis operation(s) and/or network space analysis operation(s) related to the second RF device 272.

As a further example, the first RF capture component 120 may be configured to capture RF data from the third RF device 274, which may correspond to a portable computing device such as a laptop which may utilize one or more ISM bands and/or one or more "common" RF frequencies for wireless communication. The first RF capture component 120 may be configured to utilize the network interface(s) 250 to transmit the RF data that is captured from the third RF device 274 to the RF analysis component 112 (e.g., via the network(s) 128) as part of the first captured RF data 260. The RF analysis component 112 may be configured to perform various operations based at least in part on the RF data that is captured from the third RF device 274 and received from the first RF capture component 120 as part of the first captured RF data 260. For example, based at least in part on the RF data that is captured from the third RF device 274, the RF analysis component 112 may be configured to perform RF device analysis operation(s), physical space analysis operation(s) and/or network space analysis operation(s) related to the third RF device 274.

As another example, the first RF capture component 120 may be configured to capture RF data from the fourth RF device 276, which may correspond to a peripheral device such as a mouse which may utilize one or more ISM bands and/or one or more "common" RF frequencies (e.g., Bluetooth® and/or Wi-Fi) for wireless communication. The first RF capture component 120 may be configured to utilize the network interface(s) 250 to transmit the RF data that is captured from the fourth RF device 276 to the RF analysis component 112 (e.g., via the network(s) 128) as part of the first captured RF data 260. The RF analysis component 112 may be configured to perform various operations based at least in part on the RF data that is captured from the fourth RF device 276 and received from the first RF capture component 120 as part of the first captured RF data 260. For example, based at least in part on the RF data that is captured from the fourth RF device 276, the RF analysis component 112 may be configured to perform RF device analysis operation(s), physical space analysis operation(s) and/or network space analysis operation(s) related to the fourth RF device 276.

As yet another example, the first RF capture component 120 may be configured to capture RF data from the fifth RF device 278, which may correspond to a device such as a router which may utilize one or more ISM bands and/or one or more "common" RF frequencies (e.g., Wi-Fi) for wireless communication. The first RF capture component 120 may be configured to utilize the network interface(s) 250 to transmit the RF data that is captured from the fifth RF device 278 to the RF analysis component 112 (e.g., via the network(s) 128) as part of the first captured RF data 260. The RF analysis component 112 may be configured to perform various operations based at least in part on the RF data that is captured from the fifth RF device 278 and received from the first RF capture component 120 as part of the first captured RF data 260. For example, based at least in part on the RF data that is captured from the fifth RF device 278, the RF analysis component 112 may be configured to perform RF device analysis operation(s), physical space analysis operation(s) and/or network space analysis operation(s) related to the fifth RF device 278.

Figure 3:
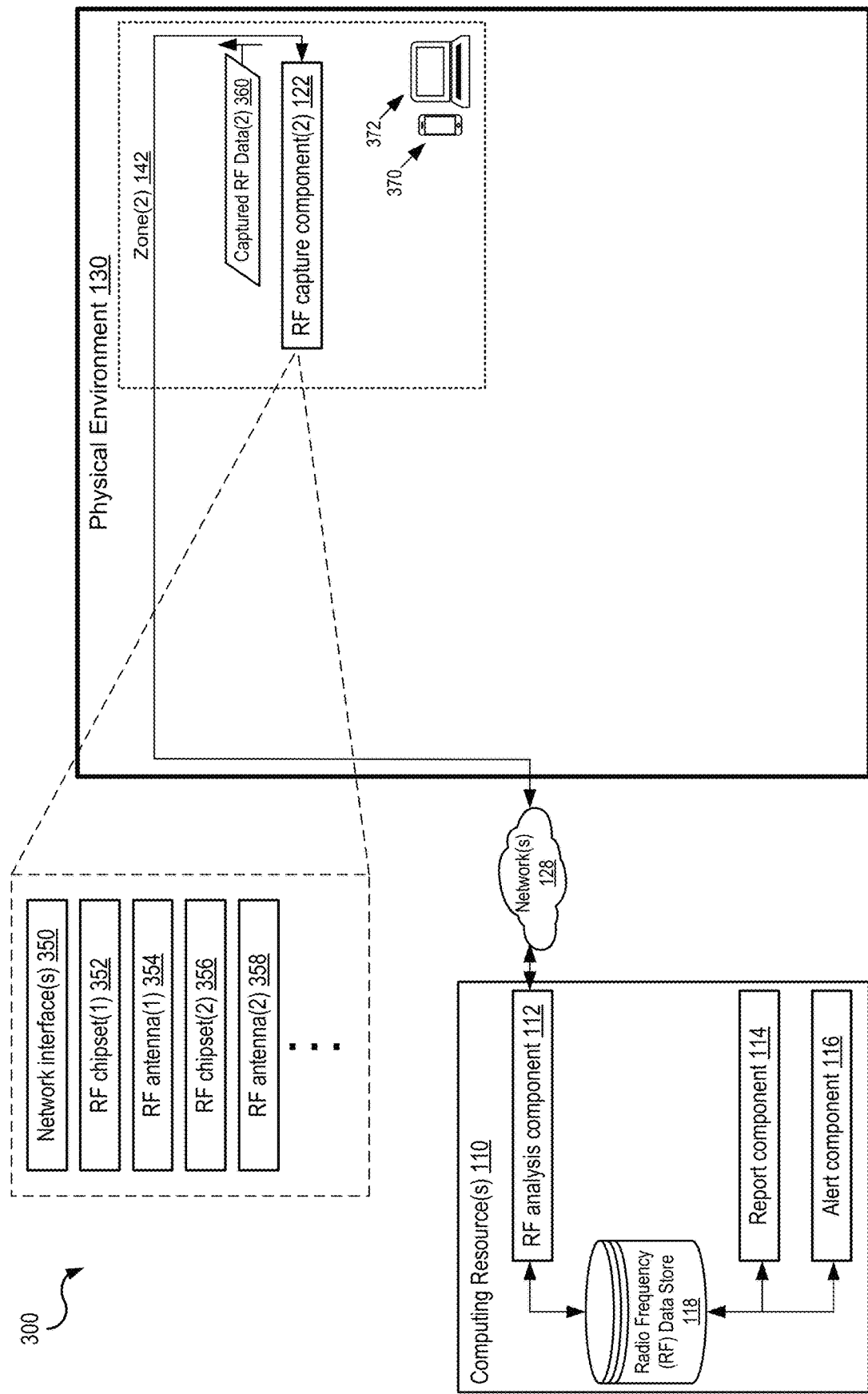

Referring to FIG. 3, a block diagram 300 illustrates an example of the second RF capture component 122 of FIG. 1 being utilized to collect RF data within the second zone 142 of the physical environment 130, according to some embodiments. FIG. 3 further illustrates the transmission of second captured RF data 360 collected by the second RF capture component 122 to the RF analysis component 112 for RF device, physical space and/or network space analysis operations, as described herein.

FIG. 3 illustrates that the second RF capture component 122 may be a second hardware device positioned within the second zone 142 of the physical environment 130. FIG. 3 further illustrates that the second RF capture component 122 may correspond to a second "RF monitoring node" that includes various components, including one or more RF chipsets, one or more antennas, and one or more network interfaces. In the particular embodiment depicted in FIG. 3, the second RF capture component 122 includes at least: one or more network interfaces 350; a first RF chipset 352 that may be associated with a first RF antenna 354; and a second RF chipset 356 that may be associated with a second RF antenna 358. FIG. 3 illustrates, via dashed lines, that the second RF capture component 122 may include one or more additional RF chipsets that may be associated with one or more additional RF antennas, according to some embodiments.

According to some embodiments, the various components of the second RF capture component 122 depicted in FIG. 3 may be configured to provide the second RF capture component 122 with the ability to cover ISM band(s) and "common" RF frequencies typically used by consumer, industrial, medical, and transportation-based technology devices. As previously described herein, examples of devices that may utilize ISM band(s) for short-range, low-power wireless communication include: Bluetooth® devices; NFC devices; and Wi-Fi devices, among others. According to some embodiments, the first RF chipset 352 and the first RF antenna 354 of the second RF capture component 122 may be configured to provide the second RF capture component 122 with the ability to capture RF data from devices that utilize a particular ISM band for short-range, low-power wireless communication. According to some embodiments, the second RF chipset 356 and the second RF antenna 358 of the second RF capture component 122 may be configured to provide the second RF capture component 122 with the ability to capture RF data from devices that utilize a particular "common" RF frequency (or a particular range of "common" RF frequencies). As described herein, in some embodiments, the second RF capture component 122 may include one or more additional RF chipsets that may be associated with one or more additional RF antennas. Such additional RF chipsets and associated RF antennas may be configured to provide the second RF capture component 122 with the ability to capture RF data from devices that utilize one or more other ISM bands for short-range, low-power wireless communication, according to some embodiments. Such additional RF chipsets and associated RF antennas may be configured to provide the second RF capture component 122 with the ability to capture RF data from devices that utilize one or more other "common" RF frequencies (or ranges of "common" RF frequencies), according to some embodiments.

In the particular embodiment depicted in FIG. 3, various RF devices are illustrated as being located within the second zone 142 of the physical environment 130. To illustrate, in FIG. 3, the devices within the second zone 142 include a first RF device 370 and a second RF device 372. The various components of the second RF capture component 122 may provide the second RF capture component 122 with the ability to capture RF data from each of the individual devices 370, 372 within the second zone 142. The various components of the second RF capture component 122 may provide the second RF capture component 122 with the ability to capture various metrics for the individual RF devices 370, 372 within the second zone 142.

The second RF capture component 122 may be configured to capture RF device fingerprint and location data for the individual RF devices 370, 372 located within the second zone 142, according to some embodiments. The second RF capture component 122 may be configured with details regarding its precise location within the physical environment 130 (e.g., details regarding its location within the second zone 142). The second RF capture component 122 may be configured to capture measured RF signal strength of the individual RF devices 370, 372 located within the second zone 142, according to some embodiments. The second RF capture component 122 may be configured to passively discover one or more of the RF devices 370, 372 based on an analysis of RF protocol broadcast, unicast, and multicast signals emitted by an individual RF device within the second zone 142. According to some embodiments, examples of metrics that may be captured by the second RF capture component 122 for the individual RF devices 370, 372 within the second zone 142 may include: protocol version(s); device manufacturer; device type; and device-specific metric(s), among other alternatives. The second RF capture component 122 may be configured to identify one or more specific RF devices of the RF devices 370, 372 within the second zone 142 that communicate with one or more other RF devices within the physical environment 130 (including other RF devices in the other zones 140, 144, 146 which are not shown in FIG. 3). The second RF capture component 122 may be configured to actively probe the individual RF devices 370, 372 within the second zone 142 for additional metrics based on the specific RF protocols that are detected as being used. According to some embodiments, examples of such additional metrics may include: protocol version(s); device manufacturer; device type; and device-specific metric(s), among other alternatives.

FIG. 3 illustrates that the second RF capture component 122 may be configured to utilize the network interface(s) 350 to transmit the RF data that is captured from the individual devices within the second zone 142 to the RF analysis component 112 (e.g., via the network(s) 128) as the second captured RF data 360. The RF analysis component 112 may be configured to perform various operations based at least in part on the second captured RF data 360 received from the second RF capture component 122, as described herein. For example, based at least in part on the second captured RF data 360 received from the second RF capture component 122, the RF analysis component 112 may be configured to perform one or more of: RF device analysis operation(s); physical space analysis operation(s); and network space analysis operation(s).

To illustrate, the second RF capture component 122 may be configured to capture RF data from the first RF device 370, which may correspond to a mobile device such as a smartphone which may utilize one or more ISM bands and/or one or more "common" RF frequencies for wireless communication. The second RF capture component 122 may be configured to utilize the network interface(s) 350 to transmit the RF data that is captured from the first RF device 370 to the RF analysis component 112 (e.g., via the network(s) 128) as part of the second captured RF data 360. The RF analysis component 112 may be configured to perform various operations based at least in part on the RF data that is captured from the first RF device 370 and received from the second RF capture component 122 as part of the second captured RF data 360. For example, based at least in part on the RF data that is captured from the first RF device 370, the RF analysis component 112 may be configured to perform RF device analysis operation(s), physical space analysis operation(s) and/or network space analysis operation(s) related to the first RF device 370.

As another example, the second RF capture component 122 may be configured to capture RF data from the second RF device 372, which may correspond to a portable computing device such as a laptop which may utilize one or more ISM bands and/or one or more "common" RF frequencies for wireless communication. The second RF capture component 122 may be configured to utilize the network interface(s) 350 to transmit the RF data that is captured from the second RF device 372 to the RF analysis component 112 (e.g., via the network(s) 128) as part of the second captured RF data 360. The RF analysis component 112 may be configured to perform various operations based at least in part on the RF data that is captured from the second RF device 372 and received from the second RF capture component 122 as part of the second captured RF data 360. For example, based at least in part on the RF data that is captured from the second RF device 372, the RF analysis component 112 may be configured to perform RF device analysis operation(s), physical space analysis operation(s) and/or network space analysis operation(s) related to the second RF device 372.

Figure 4:
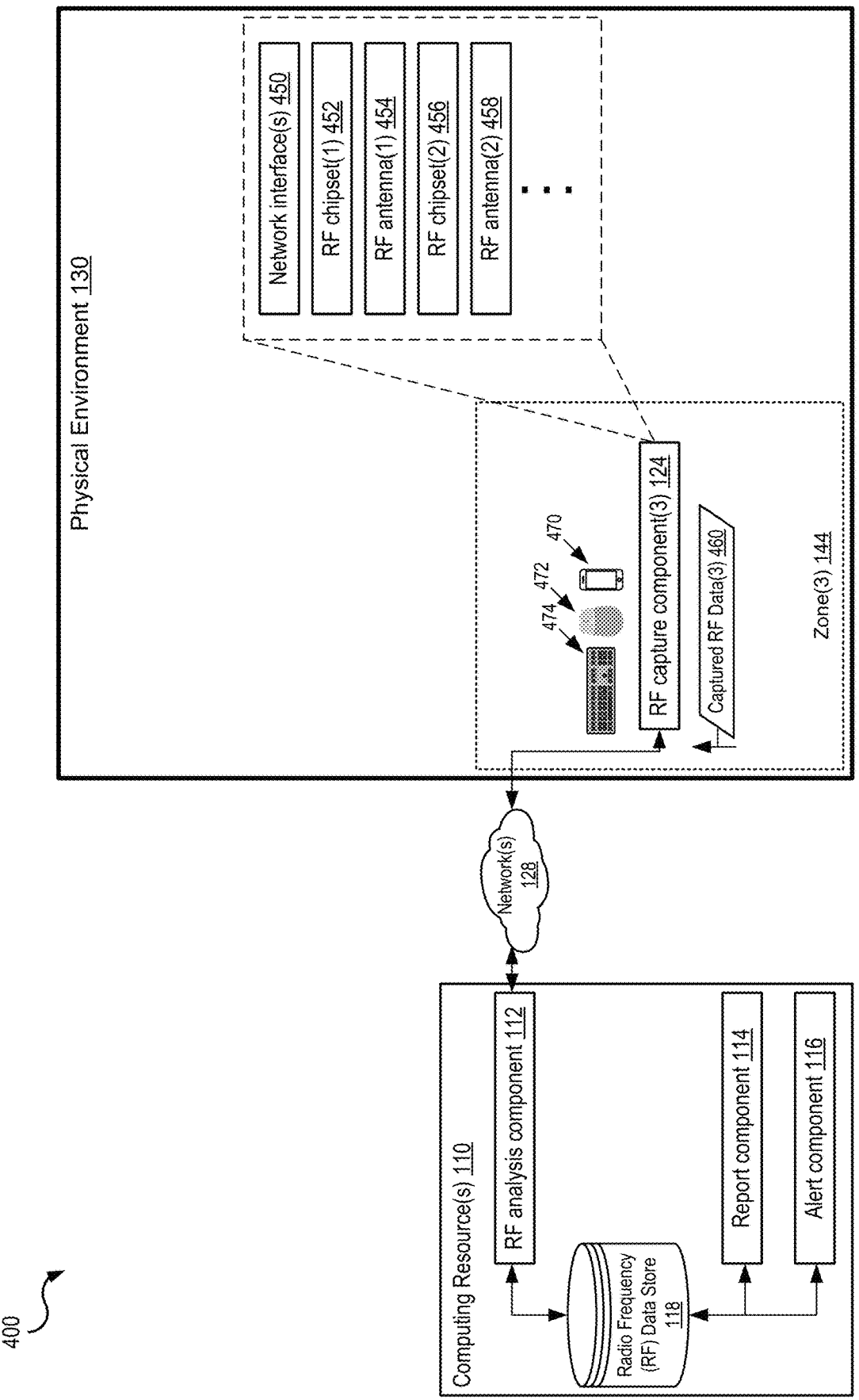

Referring to FIG. 4, a block diagram 400 illustrates an example of the third RF capture component 124 of FIG. 1 being utilized to collect RF data within the third zone 144 of the physical environment 130, according to some embodiments. FIG. 4 further illustrates the transmission of third captured RF data 460 collected by the third RF capture component 124 to the RF analysis component 112 for RF device, physical space and/or network space analysis operations, as described herein.

FIG. 4 illustrates that the third RF capture component 124 may be a third hardware device positioned within the third zone 144 of the physical environment 130. FIG. 4 further illustrates that the third RF capture component 124 may correspond to a third "RF monitoring node" that includes various components, including one or more RF chipsets, one or more antennas, and one or more network interfaces. In the particular embodiment depicted in FIG. 4, the third RF capture component 124 includes at least: one or more network interfaces 450; a first RF chipset 452 that may be associated with a first RF antenna 454; and a second RF chipset 456 that may be associated with a second RF antenna 458. FIG. 4 illustrates, via dashed lines, that the third RF capture component 124 may include one or more additional RF chipsets that may be associated with one or more additional RF antennas, according to some embodiments.

According to some embodiments, the various components of the third RF capture component 124 depicted in FIG. 4 may be configured to provide the third RF capture component 124 with the ability to cover ISM band(s) and "common" RF frequencies typically used by consumer, industrial, medical, and transportation-based technology devices. As previously described herein, examples of devices that may utilize ISM band(s) for short-range, low-power wireless communication include: Bluetooth® devices; NFC devices; and Wi-Fi devices, among others. According to some embodiments, the first RF chipset 452 and the first RF antenna 454 of the third RF capture component 124 may be configured to provide the third RF capture component 124 with the ability to capture RF data from devices that utilize a particular ISM band for short-range, low-power wireless communication. According to some embodiments, the second RF chipset 456 and the second RF antenna 458 of the third RF capture component 124 may be configured to provide the third RF capture component 124 with the ability to capture RF data from devices that utilize a particular "common" RF frequency (or a particular range of "common" RF frequencies). As described herein, in some embodiments, the third RF capture component 124 may include one or more additional RF chipsets that may be associated with one or more additional RF antennas. Such additional RF chipsets and associated RF antennas may be configured to provide the third RF capture component 124 with the ability to capture RF data from devices that utilize one or more other ISM bands for short-range, low-power wireless communication, according to some embodiments. Such additional RF chipsets and associated RF antennas may be configured to provide the third RF capture component 124 with the ability to capture RF data from devices that utilize one or more other "common" RF frequencies (or ranges of "common" RF frequencies), according to some embodiments.

In the particular embodiment depicted in FIG. 4, various RF devices are illustrated as being located within the third zone 144 of the physical environment 130. To illustrate, in FIG. 4, the devices within the third zone 144 include: a first RF device 470; a second RF device 472; and a third RF device 474. The various components of the third RF capture component 124 may provide the third RF capture component 124 with the ability to capture RF data from each of the individual devices 470-474 within the third zone 144. The various components of the third RF capture component 124 may provide the third RF capture component 124 with the ability to capture various metrics for the individual RF devices 470-474 within the third zone 144.

The third RF capture component 124 may be configured to capture RF device fingerprint and location data for the various individual RF devices 470-474 located within the third zone 144, according to some embodiments. The third RF capture component 124 may be configured with details regarding its precise location within the physical environment 130 (e.g., details regarding its location within the third zone 144). The third RF capture component 124 may be configured to capture measured RF signal strength of the various individual RF devices 470-474 located within the third zone 144, according to some embodiments. The third RF capture component 124 may be configured to passively discover one or more of the RF devices 470-474 based on an analysis of RF protocol broadcast, unicast, and multicast signals emitted by an individual RF device within the third zone 144. According to some embodiments, examples of metrics that may be captured by the third RF capture component 124 for the individual RF devices 470-474 within the third zone 144 may include: protocol version(s); device manufacturer; device type; and device-specific metric(s), among other alternatives. The third RF capture component 124 may be configured to identify one or more specific RF devices of the RF devices 470-474 within the third zone 144 that communicate with one or more other RF devices within the physical environment 130 (including other RF devices in the other zones 140, 142, 146 which are not shown in FIG. 4). The third RF capture component 124 may be configured to actively probe the individual RF devices 470-474 within the third zone 144 for additional metrics based on the specific RF protocols that are detected as being used. According to some embodiments, examples of such additional metrics may include: protocol version(s); device manufacturer; device type; and device-specific metric(s), among other alternatives.

FIG. 4 illustrates that the third RF capture component 124 may be configured to utilize the network interface(s) 450 to transmit the RF data that is captured from the individual devices within the third zone 144 to the RF analysis component 112 (e.g., via the network(s) 128) as the third captured RF data 460. The RF analysis component 112 may be configured to perform various operations based at least in part on the third captured RF data 460 received from the third RF capture component 124, as described herein. For example, based at least in part on the third captured RF data 460 received from the third RF capture component 124, the RF analysis component 112 may be configured to perform one or more of: RF device analysis operation(s); physical space analysis operation(s); and network space analysis operation(s).

To illustrate, the third RF capture component 124 may be configured to capture RF data from the first RF device 470, which may correspond to a mobile device such as a smartphone which may utilize one or more ISM bands and/or one or more "common" RF frequencies for wireless communication. The third RF capture component 124 may be configured to utilize the network interface(s) 450 to transmit the RF data that is captured from the first RF device 470 to the RF analysis component 112 (e.g., via the network(s) 128) as part of the third captured RF data 460. The RF analysis component 112 may be configured to perform various operations based at least in part on the RF data that is captured from the first RF device 470 and received from the third RF capture component 124 as part of the third captured RF data 460. For example, based at least in part on the RF data that is captured from the first RF device 470, the RF analysis component 112 may be configured to perform RF device analysis operation(s), physical space analysis operation(s) and/or network space analysis operation(s) related to the first RF device 470.

As another example, the third RF capture component 124 may be configured to capture RF data from the second RF device 472, which may correspond to a peripheral device such as a mouse which may utilize one or more ISM bands and/or one or more "common" RF frequencies (e.g., Bluetooth® and/or Wi-Fi) for wireless communication. The third RF capture component 124 may be configured to utilize the network interface(s) 450 to transmit the RF data that is captured from the second RF device 472 to the RF analysis component 112 (e.g., via the network(s) 128) as part of the third captured RF data 460. The RF analysis component 112 may be configured to perform various operations based at least in part on the RF data that is captured from the second RF device 472 and received from the third RF capture component 124 as part of the third captured RF data 460. For example, based at least in part on the RF data that is captured from the second RF device 472, the RF analysis component 112 may be configured to perform RF device analysis operation(s), physical space analysis operation(s) and/or network space analysis operation(s) related to the second RF device 472.

As a further example, the third RF capture component 124 may be configured to capture RF data from the third RF device 474, which may correspond to another peripheral device such as a keyboard which may utilize one or more ISM bands and/or one or more "common" RF frequencies (e.g., Bluetooth® and/or Wi-Fi) for wireless communication. The third RF capture component 124 may be configured to utilize the network interface(s) 450 to transmit the RF data that is captured from the third RF device 474 to the RF analysis component 112 (e.g., via the network(s) 128) as part of the third captured RF data 460. The RF analysis component 112 may be configured to perform various operations based at least in part on the RF data that is captured from the third RF device 474 and received from the third RF capture component 124 as part of the third captured RF data 460. For example, based at least in part on the RF data that is captured from the third RF device 474, the RF analysis component 112 may be configured to perform RF device analysis operation(s), physical space analysis operation(s) and/or network space analysis operation(s) related to the third RF device 474.

Figure 5:
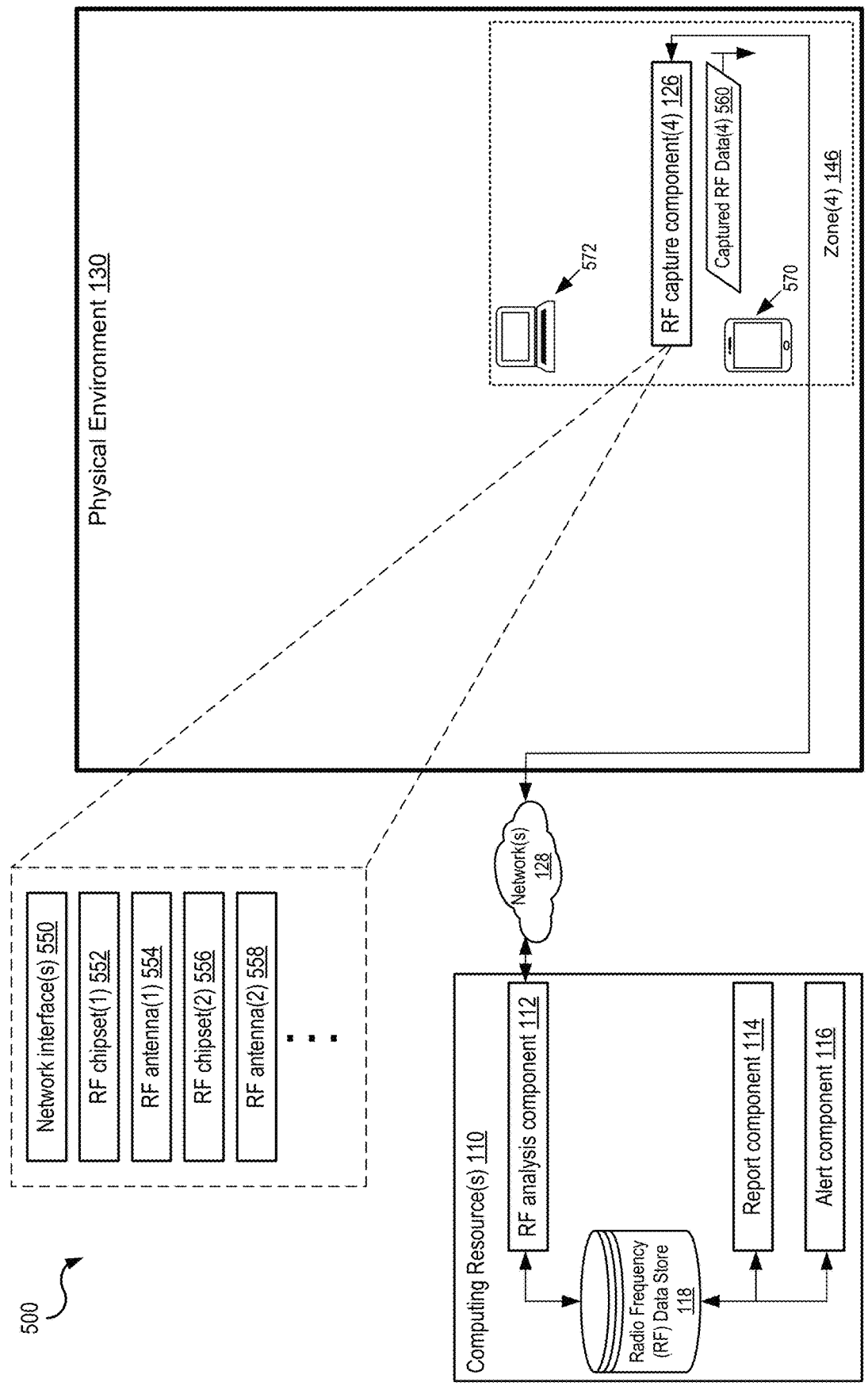

Referring to FIG. 5, a block diagram 500 illustrates an example of the fourth RF capture component 126 of FIG. 1 being utilized to collect RF data within the fourth zone 146 of the physical environment 130, according to some embodiments. FIG. 5 further illustrates the transmission of fourth captured RF data 560 collected by the fourth RF capture component 126 to the RF analysis component 112 for RF device, physical space and/or network space analysis operations, as described herein.

FIG. 5 illustrates that the fourth RF capture component 126 may be a fourth hardware device positioned within the fourth zone 146 of the physical environment 130. FIG. 5 further illustrates that the fourth RF capture component 126 may correspond to a fourth "RF monitoring node" that includes various components, including one or more RF chipsets, one or more antennas, and one or more network interfaces. In the particular embodiment depicted in FIG. 5, the fourth RF capture component 126 includes at least: one or more network interfaces 550; a first RF chipset 552 that may be associated with a first RF antenna 554; and a second RF chipset 556 that may be associated with a second RF antenna 558. FIG. 5 illustrates, via dashed lines, that the fourth RF capture component 126 may include one or more additional RF chipsets that may be associated with one or more additional RF antennas, according to some embodiments.

According to some embodiments, the various components of the fourth RF capture component 126 depicted in FIG. 5 may be configured to provide the fourth RF capture component 126 with the ability to cover ISM band(s) and "common" RF frequencies typically used by consumer, industrial, medical, and transportation-based technology devices. As previously described herein, examples of devices that may utilize ISM band(s) for short-range, low-power wireless communication include: Bluetooth® devices; NFC devices; and Wi-Fi devices, among others. According to some embodiments, the first RF chipset 552 and the first RF antenna 554 of the fourth RF capture component 126 may be configured to provide the fourth RF capture component 126 with the ability to capture RF data from devices that utilize a particular ISM band for short-range, low-power wireless communication. According to some embodiments, the second RF chipset 556 and the second RF antenna 558 of the fourth RF capture component 126 may be configured to provide the fourth RF capture component 126 with the ability to capture RF data from devices that utilize a particular "common" RF frequency (or a particular range of "common" RF frequencies). As described herein, in some embodiments, the fourth RF capture component 126 may include one or more additional RF chipsets that may be associated with one or more additional RF antennas. Such additional RF chipsets and associated RF antennas may be configured to provide the fourth RF capture component 126 with the ability to capture RF data from devices that utilize one or more other ISM bands for short-range, low-power wireless communication, according to some embodiments. Such additional RF chipsets and associated RF antennas may be configured to provide the fourth RF capture component 126 with the ability to capture RF data from devices that utilize one or more other "common" RF frequencies (or ranges of "common" RF frequencies), according to some embodiments.

In the particular embodiment depicted in FIG. 5, various RF devices are illustrated as being located within the fourth zone 146 of the physical environment 130. To illustrate, in FIG. 5, the devices within the fourth zone 146 include a first RF device 570 and a second RF device 572. The various components of the fourth RF capture component 126 may provide the fourth RF capture component 126 with the ability to capture RF data from each of the individual devices 570, 572 within the fourth zone 146. The various components of the fourth RF capture component 126 may provide the fourth RF capture component 126 with the ability to capture various metrics for the individual RF devices 570, 572 within the fourth zone 146.

The fourth RF capture component 126 may be configured to capture RF device fingerprint and location data for the individual RF devices 570, 572 located within the fourth zone 146, according to some embodiments. The fourth RF capture component 126 may be configured with details regarding its precise location within the physical environment 130 (e.g., details regarding its location within the fourth zone 146). The fourth RF capture component 126 may be configured to capture measured RF signal strength of the individual RF devices 570, 572 located within the fourth zone 146, according to some embodiments. The fourth RF capture component 126 may be configured to passively discover one or more of the RF devices 570, 572 based on an analysis of RF protocol broadcast, unicast, and multicast signals emitted by an individual RF device within the fourth zone 146. According to some embodiments, examples of metrics that may be captured by the fourth RF capture component 126 for the individual RF devices 570, 572 within the fourth zone 146 may include: protocol version(s); device manufacturer; device type; and device-specific metric(s), among other alternatives. The fourth RF capture component 126 may be configured to identify one or more specific RF devices of the RF devices 570, 572 within the fourth zone 146 that communicate with one or more other RF devices within the physical environment 130 (including other RF devices in the other zones 140, 142, 144 which are not shown in FIG. 5). The fourth RF capture component 126 may be configured to actively probe the individual RF devices 570, 572 within the fourth zone 146 for additional metrics based on the specific RF protocols that are detected as being used. According to some embodiments, examples of such additional metrics may include: protocol version(s); device manufacturer; device type; and device-specific metric(s), among other alternatives.

FIG. 5 illustrates that the fourth RF capture component 126 may be configured to utilize the network interface(s) 550 to transmit the RF data that is captured from the individual devices within the fourth zone 146 to the RF analysis component 112 (e.g., via the network(s) 128) as the fourth captured RF data 560. The RF analysis component 112 may be configured to perform various operations based at least in part on the fourth captured RF data 560 received from the fourth RF capture component 126, as described herein. For example, based at least in part on the fourth captured RF data 560 received from the fourth RF capture component 126, the RF analysis component 112 may be configured to perform one or more of: RF device analysis operation(s); physical space analysis operation(s); and network space analysis operation(s).

To illustrate, the fourth RF capture component 126 may be configured to capture RF data from the first RF device 570, which may correspond to a mobile device such as a tablet computing device which may utilize one or more ISM bands and/or one or more "common" RF frequencies for wireless communication. The fourth RF capture component 126 may be configured to utilize the network interface(s) 550 to transmit the RF data that is captured from the first RF device 570 to the RF analysis component 112 (e.g., via the network(s) 128) as part of the fourth captured RF data 560. The RF analysis component 112 may be configured to perform various operations based at least in part on the RF data that is captured from the first RF device 570 and received from the fourth RF capture component 126 as part of the fourth captured RF data 560. For example, based at least in part on the RF data that is captured from the first RF device 570, the RF analysis component 112 may be configured to perform RF device analysis operation(s), physical space analysis operation(s) and/or network space analysis operation(s) related to the first RF device 570.

As another example, the fourth RF capture component 126 may be configured to capture RF data from the second RF device 572, which may correspond to a portable computing device such as a laptop which may utilize one or more ISM bands and/or one or more "common" RF frequencies for wireless communication. The fourth RF capture component 126 may be configured to utilize the network interface(s) 550 to transmit the RF data that is captured from the second RF device 572 to the RF analysis component 112 (e.g., via the network(s) 128) as part of the fourth captured RF data 560. The RF analysis component 112 may be configured to perform various operations based at least in part on the RF data that is captured from the second RF device 572 and received from the fourth RF capture component 126 as part of the fourth captured RF data 560. For example, based at least in part on the RF data that is captured from the second RF device 572, the RF analysis component 112 may be configured to perform RF device analysis operation(s), physical space analysis operation(s) and/or network space analysis operation(s) related to the second RF device 572.

Thus, FIG. 2 through FIG. 5 illustrate examples of the individual RF capture components 120-126 depicted in FIG. 1 being utilized to collect RF data within the individual zones 140-146 of the physical environment 130. FIG. 2 through FIG. 5 further illustrate examples of the collected RF data being transmitted to the RF analysis component 112 in order to perform RF device, physical space and/or network space analysis operations, as described herein.

FIG. 6 is a flowchart 600 that illustrates an example of a process of RF capture analysis reporting, according to some embodiments.

At operation 610, the process includes receiving RF data captured by one or more RF capture components positioned at one or more locations within a physical environment. The captured RF data includes one or more RF device metrics associated with one or more RF devices identified by the one or more RF capture components as being located within the physical environment. For example, referring to FIG. 1, the computing resource(s) 110 may include hardware processor(s) with associated memory that implement the RF analysis component 112 for receiving the RF data captured by at least one of the RF capture components 120-126 positioned at their respective locations within the physical environment. As illustrated and described herein with respect to FIGS. 2-5, each of the individual RF capture components 120-126 may be positioned within their respective zones 140-146 within the physical environment 130, and each of the individual RF capture components 120-126 may be configured to transmit respective captured RF data 260, 360, 460, 560 to the RF analysis component 112 (e.g., via the network(s) 128). As illustrated and described herein with respect to FIGS. 2-5, the respective captured RF data 260, 360, 460, 560 may include one or more RF device metrics associated with various RF devices identified as being located within the respective zones 140-146 within the physical environment 130.

At operation 620, the process includes performing one or more analysis operations with respect to the one or more RF devices. The analysis operation(s) may be performed based at least in part on the RF device metric(s) included in the captured RF data received from the one or more RF capture components. For example, referring to FIG. 1, the RF analysis component 112 may be configured to perform one or more analysis operations with respect to the one or more RF devices identified by the respective RF capture components 120-126 as being located within their respective zones 140-146 within the physical environment. The RF analysis component 112 may be configured to perform the analysis operation(s) based at least in part on the RF device metric(s) included in the respective captured RF data 260, 360, 460, 560 received from the respective RF capture components 120-126, as further described herein with respect to FIG. 2 through FIG. 5.

At operation 630, the process includes identifying, based at least in part on a result of the one or more analysis operations, a potential security vulnerability associated with a particular RF device of the one or more RF devices located within the physical environment. For example, referring to the example depicted in FIG. 2, the RF analysis component 112 may be configured to identify, based at least in part on a result of the analysis operation(s) that utilizes the first captured RF data 260, a potential security vulnerability associated with one or more of the RF devices 270-278 identified by the first RF capture component 120 as being located within the first zone 140 of the physical environment 130. As another example, referring to the example depicted in FIG. 3, the RF analysis component 112 may be configured to identify, based at least in part on a result of the analysis operation(s) that utilizes the second captured RF data 360, a potential security vulnerability associated with one or more of the RF devices 370, 372 identified by the second RF capture component 122 as being located within the second zone 140. As another example, referring to the example depicted in FIG. 4, the RF analysis component 112 may be configured to identify, based at least in part on a result of the analysis operation(s) that utilizes the third captured RF data 460, a potential security vulnerability associated with one or more of the RF devices 470-474 identified by the third RF capture component 124 as being located within the third zone 144. As yet another example, referring to the example depicted in FIG. 5, the RF analysis component 112 may be configured to identify, based at least in part on a result of the analysis operation(s) that utilizes the fourth captured RF data 560, a potential security vulnerability associated with one or more of the RF devices 570, 572 identified by the fourth RF capture component 126 as being located within the fourth zone 146.

At operation 640, the process includes generating a report that identifies at least the potential security vulnerability associated with the particular RF device. For example, referring to FIG. 1, the computing resource(s) 110 may include hardware processor(s) with associated memory that implement the report component 114 for generating a report that identifies at least the potential security vulnerability associated with the particular RF device. The particular RF device may correspond to one of the RF devices identified by one of the RF capture components 120-126 positioned at their respective locations within the physical environment, as further described herein with respect to FIG. 2 through FIG. 5. To illustrate, the particular RF device may correspond to: one of the RF devices 270-278 located within the first zone 140 (see FIG. 2); one of the RF devices 370, 372 located within the second zone 142 (see FIG. 3); one of the RF devices 470-474 located within the third zone 144 (see FIG. 4); or one of the RF devices 570, 572 located within the fourth zone 146 (see FIG. 5).

Thus, FIG. 6 illustrates an example of a process of RF capture analysis reporting according to the present disclosure. Through the use of behavioral analytics using various metrics (e.g., RF protocols, communication patterns, device movement within the physical environment 130, and potential intersections with network infrastructures, etc.), captured RF data may be analyzed in order to present users with a report containing information regarding potential threats. Such information may provide various benefits, including allowing an organization to focus on reducing and mitigating information security risks from RF devices in their physical and network environments.

FIG. 7 is a block diagram illustrating an example computer system 700 that is used to implement one or more portions of a system that implements RF capture analysis reporting, according to some embodiments. For example, the computer system 700 may be a server that implements one or more components of the computing resource(s) 110 of FIG. 1.

Computer system 700 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 700 includes one or more processors 710, which may include multiple cores coupled to a system memory 720 via an input/output (I/O) interface 730. Computer system 700 further includes a network interface 740 coupled to I/O interface 730. In some embodiments, computer system 700 may be a uniprocessor system including one processor 710, or a multiprocessor system including several processors 710a-n, as shown. The processors 710 may be any suitable processors capable of executing instructions. For example, in various embodiments, processors 710 may implement one of a number of instruction set architectures (ISAs), such as the x86, PowerPC, SPARC, or MIPS ISA.

As shown, the computer system 700 may also include one or more network communication devices (e.g., network interface 740) for communicating with other systems and/or components over a communications network. For example, an instance of an application executing on computer system 700 may use network interface 740 to communicate with another server application executing on another computer system, as described herein.

As shown, computer system 700 may use its network interface 740 to communicate with one or more other devices 760, such as persistent storage devices and/or one or more I/O devices. In some embodiments, some of these other devices may be implemented locally on the computer system 700, accessible via the I/O interface 730. In various embodiments, persistent storage devices may include disk drives, tape drives, solid state memory, other mass storage devices, or any other persistent storage device. The computer system 700 may store instructions and/or data in persistent storage devices, and retrieve the stored instruction and/or data as needed.

As shown, the computer system 700 may include one or more system memories 720 that store instructions and data accessible by processor(s) 710. In various embodiments, system memories 720 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 720 may be used to store code 725 or executable instructions to implement the methods and techniques described herein. For example, the executable instructions may include instructions to implement the RF analysis component 112, the report component 114, and the alert component 116, as discussed. The system memory 720 may also be used to store data 726 needed or produced by the executable instructions. For example, the in-memory data 726 may include portions of the RF data store 118, as discussed.

In some embodiments, some of the code 725 or executable instructions may be persistently stored on the computer system 700 and may have been loaded from external storage media. The persistent storage of the computer system 700 and the external media are examples of non-transitory computer-readable storage media, which may be used to store program instructions to be executed by the computer system 700. A non-transitory computer-readable storage medium may provide the capability to store information in a form readable by a machine (e.g., computer system 700). Non-transitory computer-readable media may include storage media such as magnetic or optical media, disk or DVD/CD-ROM devices, archival tapes, network-attached storage systems, or other computer systems.

In some embodiments, the I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

In some embodiments, the network interface 740 may allow data to be exchanged between computer system 700 and other devices attached to a network. The network interface 740 may also allow communication between computer system 700 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). In some embodiments, the network interface 740 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
    one or more hardware processors with associated memory that implement radio frequency (RF) capture analysis reporting, wherein the one or more hardware processors are configured to:
        receive RF data captured by one or more RF capture components positioned at one or more locations within a physical environment, the captured RF data including one or more RF device metrics associated with one or more RF devices identified by the one or more RF capture components as being located within the physical environment;
        perform one or more analysis operations with respect to the one or more RF devices, wherein the one or more analysis operations are performed based at least in part on the one or more RF device metrics included in the captured RF data received from the one or more RF capture components, and the one or more analysis operations analyzes the one or more RF device metrics to identify transient devices in the physical environment and anomalous device movements of known devices within the physical environment;
        identify, based at least in part on a result of the one or more analysis operations, a potential security vulnerability associated with a particular RF device of the one or more RF devices located within the physical environment; and
        generate a report that identifies at least the potential security vulnerability associated with the particular RF device.

2. The system of claim 1, wherein the one or more hardware processors are further configured to:
    generate an alert responsive to identifying the potential security vulnerability associated with the particular RF device.

3. The system of claim 1, wherein the one or more RF capture components include a plurality of RF capture components, and wherein each individual RF capture component is positioned at a different location within the physical environment.

4. The system of claim 1, wherein the one or more RF capture components are configured to capture measured RF signal strength associated with the one or more RF devices.

5. The system of claim 1, wherein the one or more RF capture components are configured to passively discover the one or more RF devices based on an analysis of RF protocol broadcast, unicast, and multicast signals emitted by each individual RF device of the one or more RF devices.

6. The system of claim 1, wherein the one or more RF device metrics include one or more of: one or more protocol versions; a device manufacturer; a device type; and one or more device-specific metrics.

7. The system of claim 1, wherein the one or more analysis operations include one or more of: one or more RF device analysis operations; one or more physical space analysis operations; and one or more network space analysis operations.

8. The system of claim 1, wherein the potential security vulnerability is identified based at least in part on at least one of: a device hardware version associated with the particular RF device; a firmware version associated with the particular RF device; and one or more communication protocols associated with the particular RF device.

9. The system of claim 8, wherein the potential security vulnerability is identified based on information obtained from at least one of: one or more vulnerability databases; one or more vendor advisory sources; one or more threat intelligence feeds; and one of more standards specifications.

10. A method comprising:
    implementing, using one or more hardware processors, radio frequency (RF) capture analysis reporting, wherein the implementing comprises:
        receiving RF data captured by one or more RF capture components positioned at one or more locations within a physical environment, the captured RF data including one or more RF device metrics associated with one or more RF devices identified by the one or more RF capture components as being located within the physical environment;
        performing one or more analysis operations with respect to the one or more RF devices, wherein the one or more analysis operations are performed based at least in part on the one or more RF device metrics included in the captured RF data received from the one or more RF capture components, and the one or more analysis operations analyzes the one or more RF device metrics to identify transient devices in the physical environment and anomalous device movements of known devices within the physical environment;

identifying, based at least in part on a result of the one or more analysis operations, a potential security vulnerability associated with a particular RF device of the one or more RF devices located within the physical environment; and generating a report that identifies at least the potential security vulnerability associated with the particular RF device.

11. The method of claim 10, further comprising generating an alert responsive to identifying the potential security vulnerability associated with the particular RF device.

12. The method of claim 10, wherein the one or more RF capture components include a plurality of RF capture components, and wherein each individual RF capture component is positioned at a different location within the physical environment.

13. The method of claim 10, wherein the one or more analysis operations include one or more of: one or more RF device analysis operations; one or more physical space analysis operations; and one or more network space analysis operations.

14. The method of claim 10, wherein the potential security vulnerability is identified based at least in part on at least one of: a device hardware version associated with the particular RF device; a firmware version associated with the particular RF device; and one or more communication protocols associated with the particular RF device.

15. One or more non-transitory computer-accessible storage media storing program instructions that, when executed on or across one or more processors, implement at least a portion of a system of radio frequency (RF) capture analysis reporting and cause the system to:

receive RF data captured by one or more RF capture components positioned at one or more locations within a physical environment, the captured RF data including one or more RF device metrics associated with one or more RF devices identified by the one or more RF capture components as being located within the physical environment;

perform one or more analysis operations with respect to the one or more RF devices, wherein the one or more analysis operations are performed based at least in part on the one or more RF device metrics included in the captured RF data received from the one or more RF capture components, and the one or more analysis operations analyzes the one or more RF device metrics to identify transient devices in the physical environment and anomalous device movements of known devices within the physical environment;

identify, based at least in part on a result of the one or more analysis operations, a potential security vulnerability associated with a particular RF device of the one or more RF devices located within the physical environment; and generate a report that identifies at least the potential security vulnerability associated with the particular RF device.

16. The one or more non-transitory computer-accessible storage media of claim 15, wherein the program instructions when executed on or across the one or more processors cause the system to generate an alert responsive to identifying the potential security vulnerability associated with the particular RF device.

17. The one or more non-transitory computer-accessible storage media of claim 15, wherein the one or more RF capture components include a plurality of RF capture components, and wherein each individual RF capture component is positioned at a different location within the physical environment.

18. The one or more non-transitory computer-accessible storage media of claim 15, wherein the one or more analysis operations include one or more of: one or more RF device analysis operations; one or more physical space analysis operations; and one or more network space analysis operations.

19. The one or more non-transitory computer-accessible storage media of claim 15, wherein the potential security vulnerability is identified based at least in part on at least one of: a device hardware version associated with the particular RF device; a firmware version associated with the particular RF device; and one or more communication protocols associated with the particular RF device.

20. The one or more non-transitory computer-accessible storage media of claim 19, wherein the program instructions when executed on or across the one or more processors cause the system to:

obtain information from one or more data sources to identify the potential security vulnerability, the one or more data sources including at least one of: one or more vulnerability databases; one or more vendor advisory sources; one or more threat intelligence feeds; and one of more standards specifications.

\* \* \* \* \*